US008849888B2

(12) United States Patent
Fawcett

(10) Patent No.: US 8,849,888 B2
(45) Date of Patent: *Sep. 30, 2014

(54) CANDIDATE SET SOLVER WITH USER ADVICE

(71) Applicant: International Business Machines Corporation, Armonk, NY (US)

(72) Inventor: Bradley W. Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,946

(22) Filed: Dec. 8, 2012

(65) Prior Publication Data

US 2013/0144931 A1 Jun. 6, 2013

Related U.S. Application Data

(63) Continuation of application No. 13/308,881, filed on Dec. 1, 2011.

(51) Int. Cl.
*G06F 15/16* (2006.01)

(52) U.S. Cl.
USPC ........... 709/201; 709/203; 709/223; 709/226; 718/1; 718/104; 718/106

(58) Field of Classification Search
USPC .............. 709/203, 223, 226, 201; 718/1, 104, 718/106, 300
See application file for complete search history.

(56) References Cited

U.S. PATENT DOCUMENTS

| 6,097,886 A | 8/2000 | Dave et al. |
| 6,393,473 B1 * | 5/2002 | Chu ............................. 709/223 |
| 7,493,406 B2 | 2/2009 | Amini et al. |
| 7,539,976 B1 * | 5/2009 | Ousterhout et al. .......... 717/120 |
| 7,613,848 B2 | 11/2009 | Amini et al. |

(Continued)

FOREIGN PATENT DOCUMENTS

| CN | 1744593 A | 3/2006 |
| EP | 0936547 A2 | 8/1999 |

OTHER PUBLICATIONS

Madden, Samuel et al., Fjording the Stream: An Architecture for Queries over Streaming Sensor Data, Proceedings of the 18th International Conference on Data Engineering, 2002, p. 555, IEEE, Piscataway, New Jersey, United States.

(Continued)

*Primary Examiner* — Hitesh Patel
(74) *Attorney, Agent, or Firm* — Patterson & Sheridan LLP

(57) ABSTRACT

A stream application uses small chunks of executable code configured to process data tuples flowing into a processing element. A scheduler allocates the processing elements to individual compute nodes or hosts for execution. However, the stream application may assign various constraints that stipulate which hosts are suitable for a particular processing element. If a host meets the constraints, it may be categorized as an unconditional candidate host. In addition, the scheduler may also track conditional candidate hosts that would be suitable for the processing element if a certain user action is performed—e.g., modifying a constraint, removing a constraint, modifying a stream element, and the like. The list of conditional candidate hosts may then be displayed to the user who can choose to perform the one or more actions to change the conditional candidate host to an unconditional candidate host for the processing element.

14 Claims, 10 Drawing Sheets

(56) References Cited

U.S. PATENT DOCUMENTS

| | | | |
|---|---|---|---|
| 7,657,855 | B1 | 2/2010 | Manaker, Jr. et al. |
| 7,676,552 | B2 | 3/2010 | Eilam et al. |
| 7,676,788 | B1* | 3/2010 | Ousterhout et al. .......... 717/106 |
| 7,899,861 | B2 | 3/2011 | Feblowitz et al. |
| 8,225,319 | B2 | 7/2012 | Laithwaite et al. |
| 2004/0039815 | A1 | 2/2004 | Evans et al. |
| 2005/0177600 | A1 | 8/2005 | Eilam et al. |
| 2005/0198244 | A1 | 9/2005 | Eilam et al. |
| 2007/0021998 | A1 | 1/2007 | Laithwaite et al. |
| 2008/0127191 | A1 | 5/2008 | Barsness et al. |
| 2008/0134193 | A1 | 6/2008 | Corley et al. |
| 2008/0174598 | A1 | 7/2008 | Risenhoover |
| 2008/0225326 | A1* | 9/2008 | Kephart et al. ............. 358/1.15 |
| 2009/0132541 | A1 | 5/2009 | Barsness et al. |
| 2009/0183168 | A1 | 7/2009 | Uchida |
| 2009/0239480 | A1* | 9/2009 | Rofougaran et al. ........... 455/73 |
| 2009/0241123 | A1 | 9/2009 | Bansal et al. |
| 2009/0300326 | A1 | 12/2009 | Sweeney |
| 2009/0300615 | A1* | 12/2009 | Andrade et al. ............. 718/100 |
| 2009/0300623 | A1 | 12/2009 | Bansal et al. |
| 2009/0306615 | A1 | 12/2009 | Olsson |
| 2009/0313614 | A1 | 12/2009 | Andrade et al. |
| 2010/0292980 | A1 | 11/2010 | Andrade et al. |
| 2010/0325621 | A1* | 12/2010 | Andrade et al. ............. 717/156 |
| 2011/0005519 | A1 | 1/2011 | Shiue |
| 2011/0055519 | A1 | 3/2011 | Schenfeld et al. |
| 2011/0246549 | A1 | 10/2011 | Katzenberger et al. |
| 2012/0096468 | A1* | 4/2012 | Chakravorty et al. ........ 718/103 |
| 2012/0110550 | A1* | 5/2012 | Ghosh et al. .................. 717/126 |
| 2013/0144931 | A1 | 6/2013 | Fawcett |
| 2013/0145034 | A1 | 6/2013 | Fawcett |
| 2013/0145121 | A1 | 6/2013 | Fawcett |

OTHER PUBLICATIONS

Liew, C.S. et al., Towards Optimising Distributed Data Streaming Graphs using Parallel Streams, Proceedings of the 19th ACM International Symposium on High Performance Distributed Computing, 2010, pp. 725-736, ACM, New York, New York, United States.

Lakshmanan, Geetika T. et al., Biologically-Inspired Distributed Middleware Management for Stream Processing Systems, Proceedings of the 9th ACM/IFIP/USENIX International Conference on Middleware, 2008, pp. 223-242, Springer-Verlag New York, Inc., New York, New York, United States.

IBM, IBM InfoSphere Streams V2.0 extends streaming analytics, simplifies development of streaming applications, and improves performance, Apr. 12, 2011, pp. 1-17, IBM Corporation, Armonk, New York, United States.

Bouillet, Eric et al., Scalable, Real-time Map-Matching using IBM's System S, Proceedings of the 2010 Eleventh International Conference on Mobile Data Management, 2010, pp. 249-257, IEEE Computer Society, Washington, DC, United States.

Lakshmanan, G. T. et al., Placement Strategies for Internet-Scale Data Stream Systems, Nov. 11, 2008, p. 50, vol. 12, Issue 6, IEEE Computer Society, Washington, DC, United States.

Le, Jia-Jin et al., DDSQP: A WSRF-Based Distributed Data Stream Query System, Lecture Notes in Computer Science, 2005, pp. 833-844, vol. 3758, Springer, New York, New York, United States.

Ahmad, Yanif et al., Network Awareness in Internet-Scale Stream Processing, IEEE Data Engineering Bulletin, Mar. 2005, pp. 63-69, vol. 28, No. 1, IEEE, Piscataway, New Jersey, United States.

Gedik, Bugra, High-performance Event Stream Processing Infrastructures and Applications with System S, IBM Research, 2009, IBM Corporation, Armonk, New York, United States.

Zhang, Xiaolan J. et al., Workload Characterization for Operator-Based Distributed Stream Processing Applications, Proceedings of the Fourth ACM International Conference on Distributed Event-Based Systems, 2010, pp. 235-247, ACM, New York, New York, United States.

Amini, Lisa et al., Adaptive Control of Extreme-scale Stream Processing Systems [Abstract], Proceedings of the 26th IEEE International Conference on Distributed Computing Systems, 2006, IEEE Computer Society, Washington, DC, United States, <http://dl.acm.org/citation.cfm?id=1154083>.

Guha, Radha et al., An efficient placement algorithm for run-time reconfigurable embedded system, Proceedings of the 19th IASTED International Conference on Parallel and Distributed Computing and Systems, 2007, ACTA Press, Anaheim, California, United States, <http://portal.acm.org/citation.cfm?id=1647581>.

Fawcett, Bradley W., "Dynamically Configurable Placement Engine", U.S. Appl. No. 13/308,800, filed Dec. 1, 2011.

Fawcett, Bradley W., "Agile Hostpool Allocator", U.S. Appl. No. 13/308,841, filed Dec. 1, 2011.

Fawcett, Bradley W., "Candidate Set Solver With User Advice", U.S. Appl. No. 13/308,881, filed Dec. 1, 2011.

Bugra Gedik et al., "SPADE: The System S Declarative Stream Processing Engine", ACM, SIGMOD '08, Jun. 9-12, 2008, Vancouver, BC, Canada, sections 2, 4.1, 5.3, pp. 1123-1134.

Kun-Lung Wu et al., "Challenges and Experience in Prototyping a Multi-Modal Stream Analytic and Monitoring Application on System S", VLDB '07, Sep. 23-28, 2007, Vienna, Austria, pp. 1185-1196.

International Search Report and Written Opinion of the ISA dated Apr. 25, 2013—International Application No. PCT/IB2012/056823.

International Search Report and Written Opinion of the ISA dated Apr. 25, 2013—International Application No. PCT/IB2012/056818.

* cited by examiner

405

| HOST | CHARACTERISTIC TAG |
|---|---|
| HOST A | RED |
| HOST B | RED |
| HOST C | RED, BLUE |
| HOST D | BLUE, GREEN |
| HOST E | BLUE |
| HOST F | BLUE |

410

| HOSTPOOL | SIZE | TAG |
|---|---|---|
| HOSTPOOL 1 | 2 | RED |
| HOSTPOOL 2 | 3 | BLUE |
| HOSTPOOL 3 | 1 | GREEN |

415

| HOSTPOOL | ELIGIBLE HOST |
|---|---|
| HOSTPOOL 1 | HOST A, B, or C |
| HOSTPOOL 2 | HOST C, D, E, or F |
| HOSTPOOL 3 | HOST D |

| ALLOCATION WITHOUT CONSIDERING CONSTRAINTS ||
|---|---|
| HOSTPOOL | PINNED HOSTS |
| HOSTPOOL 1 | HOSTS A and B |
| HOSTPOOL 2 | HOSTS C, D, and E |
| HOSTPOOL 3 | HOST D |

425

| PE | ASSOCIATED HOSTPOOL | CONSTRAINT |
|---|---|---|
| PE1 | HOSTPOOL 1 | CO-LOCATE GROUP1 |
| PE2 | HOSTPOOL 2 | CO-LOCATE GROUP1; EX-LOCATE GROUP 1 |
| PE3 | HOSTPOOL 3 | EX-LOCATE GROUP1 |
| PE4 | HOSTPOOL 2 | EX-LOCATE GROUP1 |
| PE5 | HOSTPOOL 2 | EX-LOCATE GROUP1 |

430

| ALLOCATION WITH CONSTRAINTS |||
|---|---|---|
| HOSTPOOL | PINNED HOSTS | PE ALLOCATION |
| HOSTPOOL 1 | HOSTS A and C | PE1→HOST C; |
| HOSTPOOL 2 | HOSTS C, E, and F | PE2→HOST C; PE4→HOST E; PE5→HOST F |
| HOSTPOOL 3 | HOST D | PE3→HOST D |

FIG. 4B

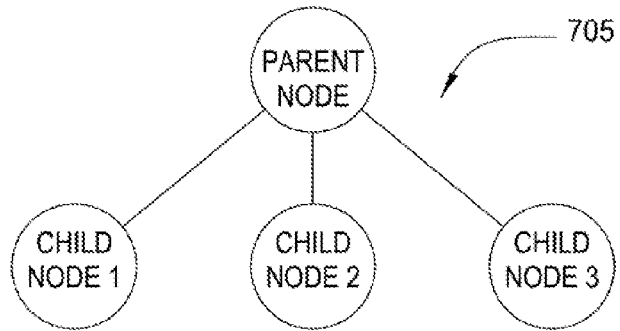

FIG. 7A

| CANDIDATE HOSTS FOR CHILD NODE 1 | CANDIDATE HOSTS FOR CHILD NODE 2 | CANDIDATE HOSTS FOR CHILD NODE 3 | CANDIDATE HOSTS FOR PARENT NODE |
|---|---|---|---|
| HOST A<br>- ADD "RED" TAG | HOST A | HOST A<br>- ADD "BLUE" TAG | HOST A<br>- ADD "RED" TAG<br>- ADD "BLUE" TAG |
| HOST B | HOST B<br>- RESTART HOST | N/A | N/A |
| HOST C<br>- CANCEL JOB 1 | HOST C<br>- DISABLE HOST LOAD PROTECTION | HOST C<br>- ADD "BLUE" TAG | HOST C<br>- CANCEL JOB 1<br>- DISABLE HOST LOAD PROTECTION<br>- ADD "BLUE" TAG |
| HOST D | HOST D | HOST D | HOST D |
| NEW HOST | NEW HOST<br>- ADD "RED" TAG | NEW HOST<br>- ADD "BLUE" TAG | NEW HOST<br>- ADD "RED" TAG<br>- ADD "BLUE" TAG |

UNCONDITIONAL HOST: ☐
CONDITIONAL HOST: ___

CANDIDATE SET SOLVER WITH USER ADVICE

CROSS-REFERENCED RELATED APPLICATIONS

This application is a continuation of co-pending U.S. patent application Ser. No. 13/308,881, filed Dec. 1, 2011. The aforementioned related patent application is herein incorporated by reference in its entirety.

BACKGROUND

1. Field of the Invention

Embodiments of the present invention generally relate to stream applications. Specifically, the invention relates to determining whether a processing element in a stream application may be allocated to a conditional candidate host for execution.

2. Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the present invention generally relate to stream applications. Specifically, the invention relates to indentifying potential candidate hosts for a processing element in a stream application.

Embodiments of the present invention include a computer-implemented method, system, and computer readable storage medium for allocating a processing element selected from a plurality of processing elements to a compute node. The method, system, and storage medium include comparing the compute node to a first constraint associated with a first level of a constraint tree. The first constraint determines whether the compute node can be allocated to the processing element. If the compute node does not satisfy the first constraint, the method, system, and storage medium also include determining whether the compute node satisfies a second constraint of the constraint tree. If the compute node does satisfy the second constraint, the method, system, and storage medium include transmitting for display a user action that at least one of (i) changes a condition such that the compute node satisfies the first constraint and (ii) instructs the first constraint to be ignored. After the user action is performed, the method, system, and storage medium allocate the processing element to the compute node.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 4A-4B illustrate tables detailing the assignment of hosts to hostpools, according to embodiments of the invention.

FIG. 7A-7B illustrate determining conditional and unconditional candidate hosts using the constraint tree of FIG. 6, according to embodiments of the invention.

DETAILED DESCRIPTION

Figure 1A:
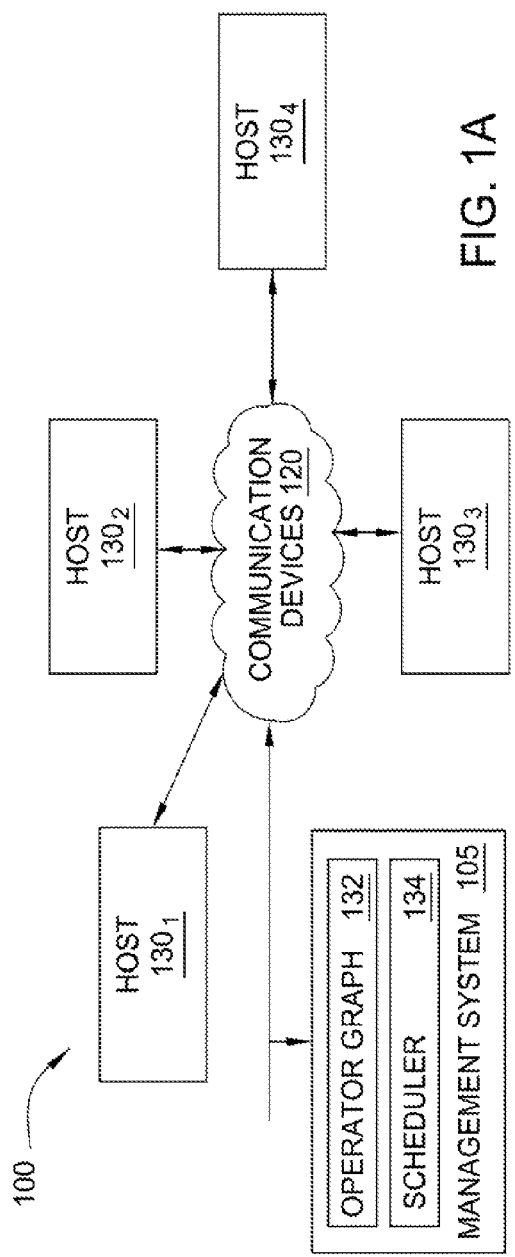
FIGS. 1A-1B illustrate a computing infrastructure configured to execute a stream application, according to one embodiment of the invention.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream application, operators are connected to one another such that data flows from one operator to the next forming a logical dataflow graph. Scalability is reached by distributing an application across compute nodes by creating many small executable pieces of code—i.e., processing elements (PE)—as well as load balancing among them. One or more operators in a stream application can be fused together to form a PE. Doing so allows the fused operators to share a common process space (i.e., shared memory), resulting in much faster communication between operators than is available using inter-nodal communication protocols (e.g., using a TCP/IP). Further, groups of processing elements—i.e., jobs—can be inserted or removed dynamically from one or more applications performing streaming data analysis.

One advantage of stream applications is that they allow the user to granularly control the process flow of data through the application. In other words, the user may designate specific operators for each PE that perform various operations on the incoming data, and may dynamically alter the stream application by modifying the operators and the order in which they are performed.

Additionally, a stream application may use a hostpool (i.e., a collections of hosts that have been assigned to PEs) when assigning each PE to a compute node. Stated simply, the PE is a portion of the stream application that is assigned to execute on a particular host—i.e., a compute node with the necessary hardware to perform the software functions defined by the PE. How the PEs are placed onto the available hosts determine the runtime characteristics of the stream application—e.g., performance, availability, etc. PEs, operators, hostpools, jobs, and even hosts may have associated constraints that dictate the runtime characteristics of the stream; for example, whether the PE can be placed on a host that is also executing other PEs or whether two PEs must be placed on the same host. The first constraint may increase the availability of the stream application while the second may increase its performance.

However, the constraints may be assigned such that the no host satisfies all of the constraints. Accordingly, the stream application may fail to allocate each PE to a host. Typically, a user of the stream application (a developer, system administrator, etc.) would have to add or remove constraints in order to places all the PEs on a host. Instead, the stream application may create a different category of hosts besides differentiating only between hosts that do, or do not, satisfy all the constraints. The new class of hosts may be grouped into the conditional candidate host set.

When allocated PEs to hosts, the stream application may evaluate constraints in a particular order. For example, the application may first evaluate all the constraints associated with one or more operators. Each host that meets these constraints may then be compared sequentially to the constraints associated with a hostpool, hosts, PEs, and jobs. As more constraints are considered, the pool of candidate hosts may be reduced. After applying all the constraints, the hosts that have not been eliminated are unconditional candidate hosts for a particular PE. That is, the PE may be allocated to any of the unconditional candidate hosts and ensure that all the constraints of the stream application are met. In addition to eliminating hosts, the stream application may add each host eliminated from the unconditional candidate host set to the conditional candidate host set if there is an user action that when performed, will satisfy the constraint and result in the host becoming an unconditional candidate host. The stream application may then continue to track these conditional candidate hosts to see if they meet any additional constraints that may be applied. For example, candidate Host A may satisfy all the constraints associated with the hosts, hostpools, and jobs but not all the constraints associated with the PE. The stream application may display this information to the user along with the user action that qualifies Host A to move from the conditional candidate host set to the unconditional candidate host set. In this case, the user action could satisfy the constraints associated with the PE. Doing so would result in Host A meeting all the constraints of the stream application, thereby moving it into the unconditional candidate host set.

Instead of requiring the user to blindly evaluate the constraints to determine what might be changed to allocate all the PEs to respective hosts or to improve the runtime characteristics of the stream application, the stream application informs the user of conditional candidate hosts and what user action may be performed that would yield the desired result.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the compute nodes or hosts used to create a stream application may be virtual or physical machines maintained by a cloud service provider. Doing so allows a user to send data to the stream application from any computing system attached to a network connected to the cloud (e.g., the Internet).

Figure 1B:
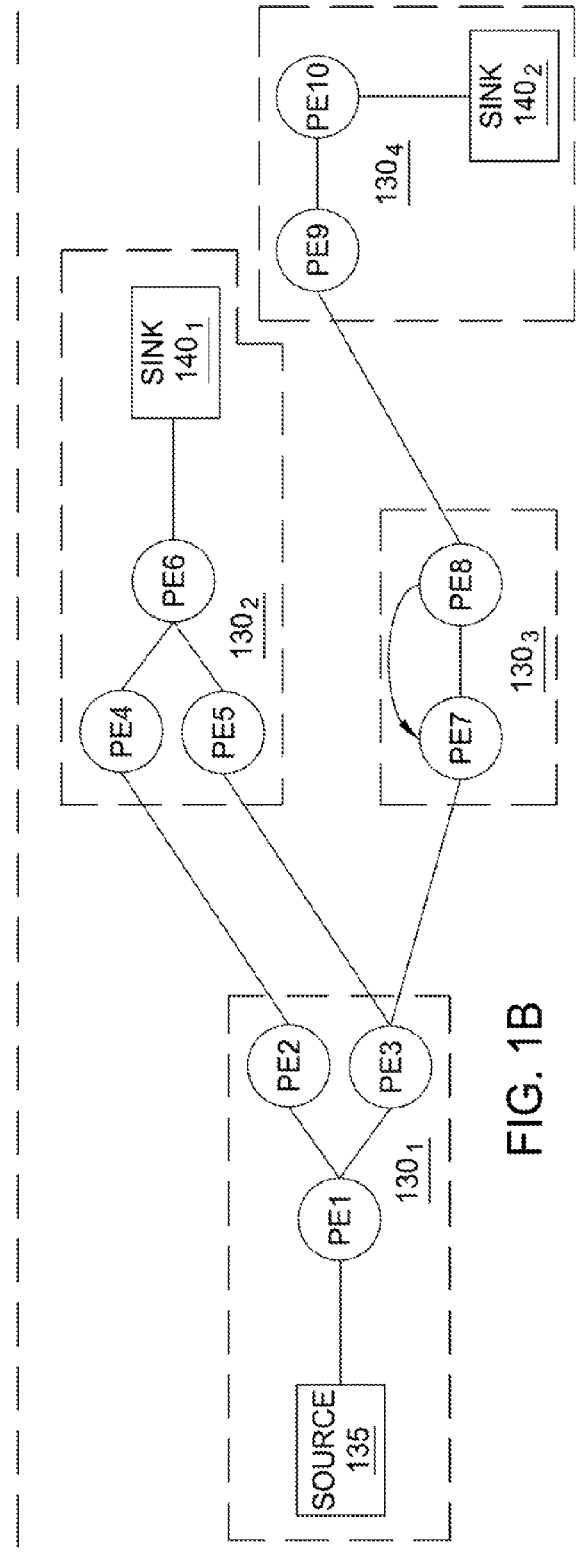

FIGS. 1A-1B illustrate a computing infrastructure configured to execute a stream application, according to one embodiment of the invention. As shown, the computing infrastructure 100 includes a management system 105 and a plurality of hosts $130_{1-4}$—i.e., compute nodes—which are communicatively coupled to each other using one or more communication devices 120. The communication devices 120 may be a server, network, or database and may use a particular communication protocol to transfer data between the hosts $130_{1-4}$. Although not shown, the hosts $130_{1-4}$ may have internal communication devices for transferring data between PEs located on the same host 130. Also, the management system 105 includes an operator graph 132 and a scheduler 134 (i.e., a stream manager). As described in greater detail below, the operator graph 132 represents a stream application beginning from one or more source operators through to one or more sink operators. This flow from source to sink is also generally referred to herein as an execution path. Typically, processing elements receive an N-tuple of data attributes from the stream as well as emit an N-tuple of data attributes into the stream (except for a sink operator where the stream terminates or a source operator where the stream begins). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The scheduler 134 may be configured to monitor a stream application running on the hosts $130_{1-4}$, as well as to change the deployment of the operator graph 132. The scheduler 134 may, for example, move PEs from one host 130 to another to manage the processing loads of the hosts $130_{1-4}$ in the computing infrastructure 100.

FIG. 1B illustrates an example operator graph 132 that includes ten processing elements (labeled as PE1-PE10) running on the hosts $130_{1-4}$. A processing element is composed of one or more operators fused together into an independently running process with its own process ID (PID) and memory space. In cases where two (or more) processing elements are running independently, inter-nodal communication may occur using a network socket (e.g., a TCP/IP socket). However, when operators are fused together, the fused operators can use more rapid intra-nodal communication protocols, such as shared memory, for passing tuples among the joined operators in the fused processing elements.

As shown, the operator graph begins at a source 135 (that flows into the processing element labeled PE1) and ends at sink $140_{1-2}$ (that flows from the processing elements labeled as PE6 and PE10). Host $130_1$ includes the processing elements PE1, PE2, and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on host $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on host $130_3$, which itself shows data tuples flowing to PE8 and looping back to PE7. Data tuples emitted from PE8 flow to PE9 on host $130_4$, which in turn emits tuples to be processed by sink PE10 $140_2$.

Furthermore, although embodiments of the present invention are described within the context of a stream application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
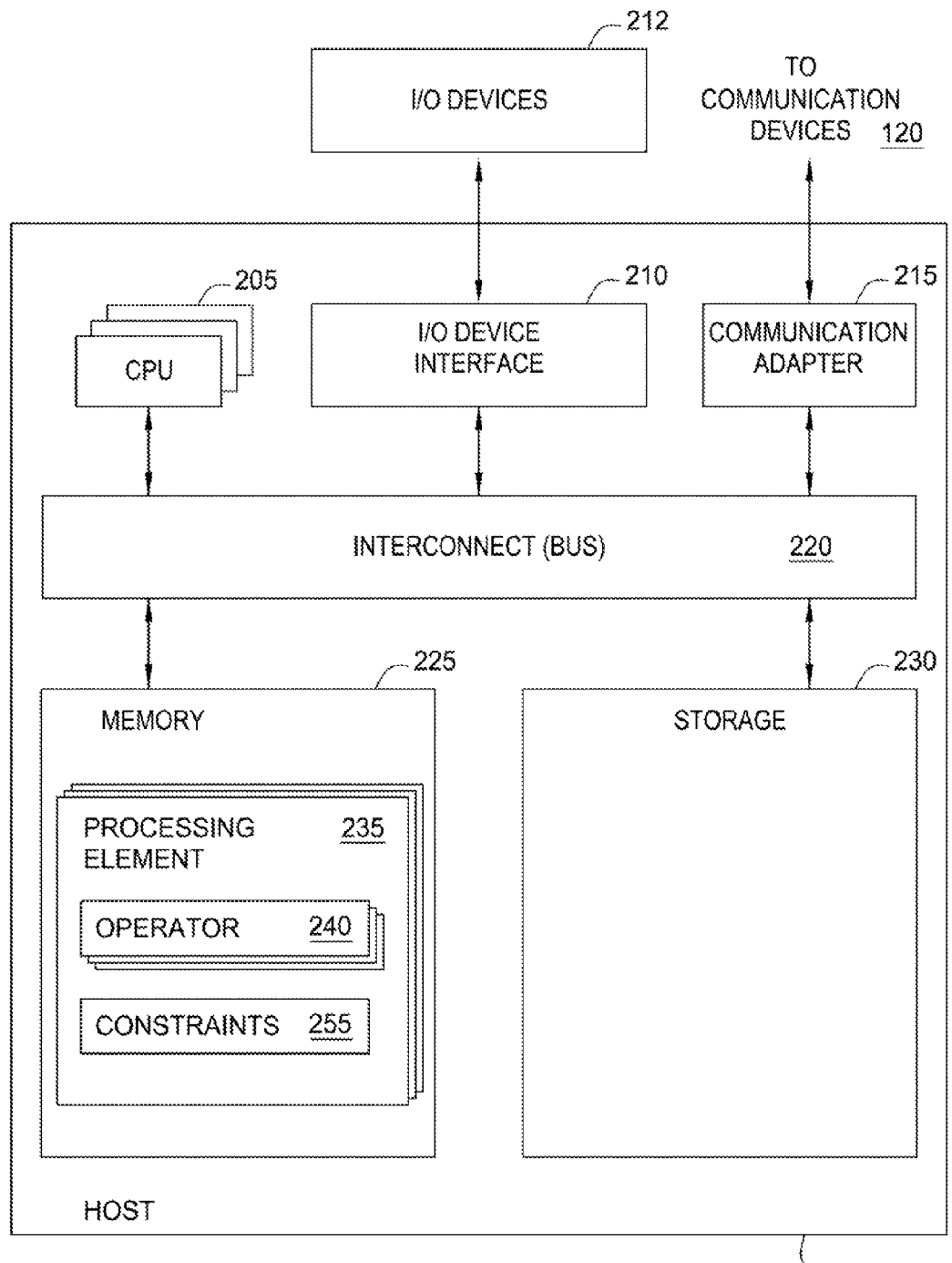
FIG. 2 is a more detailed view of the hosts of FIGS. 1A-1B, according to one embodiment of the invention.

FIG. 2 is a more detailed view of a host 130 of FIGS. 1A-1B, according to one embodiment of the invention. As shown, the host 130 includes, without limitation, at least one CPU 205, a communication adapter 215, an interconnect 220, a memory 225, and storage 230. The host 130 may also include an I/O devices interface 210 used to connect I/O devices 212 (e.g., keyboard, display and mouse devices) to the host 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, communication adapter 215, and memory 225. CPU 205 is representative of a single CPU, multiple CPUs, a single CPU having multiple processing cores, and the like. The memory 225 is generally included to be representative of a random access memory (e.g., DRAM or Flash). Storage 230, such as a hard disk drive, solid state device (SSD), or flash memory storage drive, may store non-volatile data. The communication adapter 215 (e.g., a network adapter or query engine) facilitates communication with one or more communication devices 120 that use a particular communication protocol, such as TCP/IP, RDMA protocols, a shared file system protocol, and the like.

In this example, the memory 225 includes multiple processing elements 235. Each PE 235 includes a collection of fused operators 240. As noted above, each operator 240 may provide a small chunk of executable code configured to process data flowing into a processing element (e.g., PE 235) and to emit data to other operators 240 in that PE 235 or to other processing elements in the stream application. PEs 235 may be allocated to the same host 130 or located on other hosts 130 and communicate via the communication devices 120. In one embodiment, a PE 235 can only be allocated to one host 130.

A PE 235 may also include constraints 255 that govern, at least partially, how the scheduler 134 determines a candidate host 130 for a PE 235. For example, a constraint 255 associated with a PE 235 or operator 240 may comprise "isolation" which stipulates that the associated operator 240 cannot share a host 130 with any other PE 235, "co-location" which stipulates that multiple PEs 235 in a group must execute on the same host 130, "ex-location" which stipulates that multiple PEs 235 in a group cannot execute on the same host 130, "explicit host" which stipulates that a PE 235 must be located on a specific host 130 (e.g., host $130_1$), "non-relocatable" which stipulates that a PE 235 cannot be relocated after being allocated to a host 130, "override" which stipulates that which host 130 must be allocated to which PE 235 and overrides any previous constraints, "indexing the hostpool" which stipulates the host 130 that will execute the PE 235 based on an index value of the hostpool, and the like. Other constraints 255 may be associated with the host 130 instead of the PE 235 or operator 240 such as "overloaded host" which stipulates a maximum number of PEs 235 that may be allocated to the host 130, or "scheduling state" which stipulates whether the host 130 is in a state that supports hosting a new PE 235. However, constraints 255 are not limited to the elements discussed above but may be associated with other elements of the stream application which are considered by the scheduler 134 when allocating PEs 235 to hosts 130.

Moreover, the example constraints 255 listed above are not intended to be an exhaustive list of all possible constraints 255. Instead, one of ordinary skill in the art will recognize that the embodiments disclosed herein may be used with many different techniques of specifying which host 130 is to be allocated to a particular PE 235 or operator 240.

Figure 3:
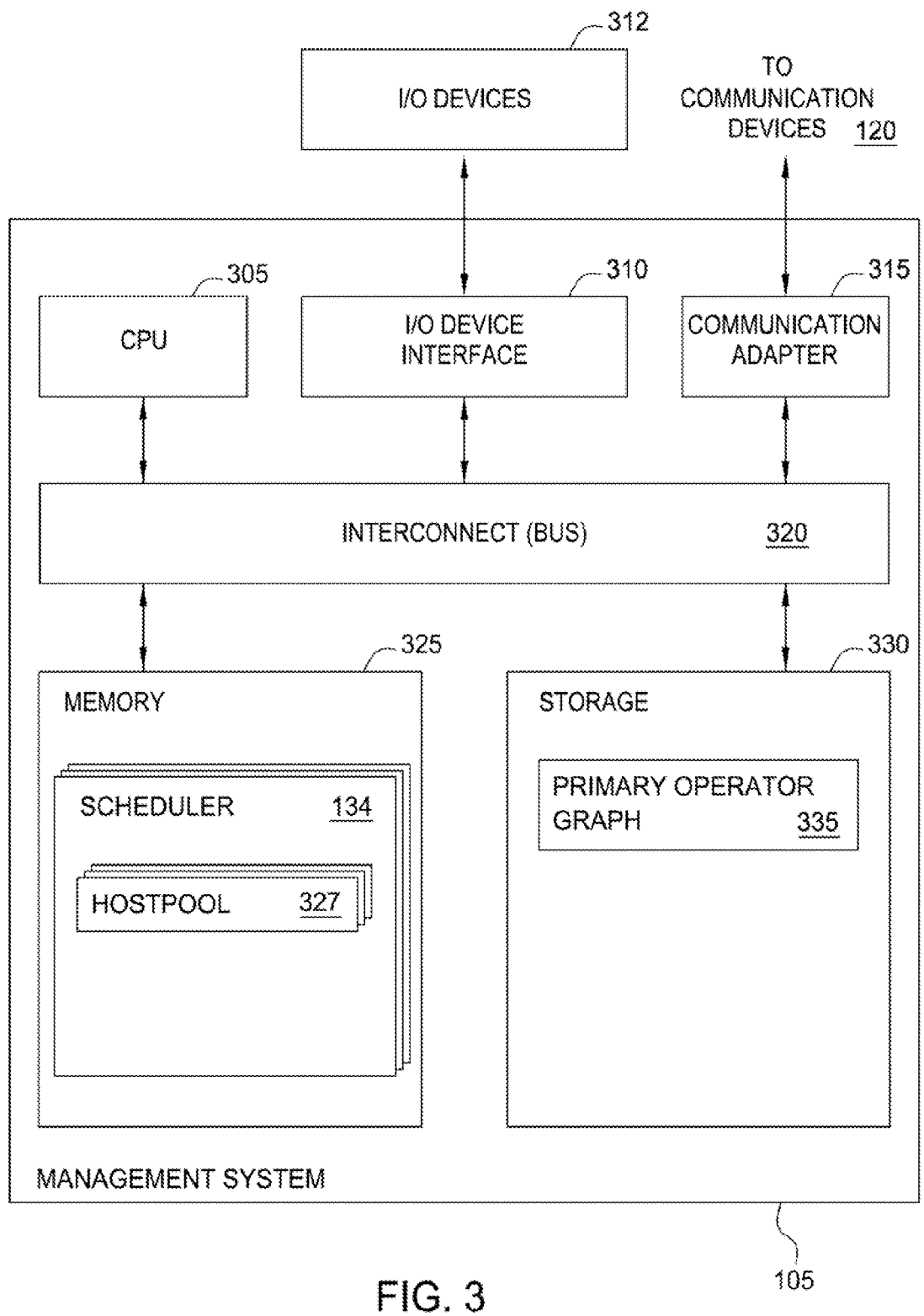
FIG. 3 is a more detailed view of the management system of FIG. 1, according to one embodiment of the invention.

FIG. 3 is a more detailed view of the management system 105 of FIG. 1, according to one embodiment of the invention. As shown, management system 105 includes, without limitation, at least one CPU 305, communication adapter 315, an interconnect 320, a memory 325, and storage 330. The client system 130 may also include an I/O device interface 310 connecting I/O devices 312 (e.g., keyboard, display and mouse devices) to the management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, communication adapters 315, and memory 325. Like CPU 205, CPU 305 is included to be representative of a single CPU, multiple CPUs, a single CPU having multiple processing cores, and the like. Memory 325 is generally included to be representative of a random access memory. The communication adapter 315 is configured to transmit data via the communication devices 120 to the hosts 130 using any number of communication protocols. This may be the same or different communication protocol used by the PEs 235 to transmit data. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices. The storage includes a primary operator graph 335. The primary operator graph 335, like the one illustrated in FIG. 1B, defines the arrangement of the processing elements, as well as the execution path use by processing element 235 to communicate with a downstream processing element 235.

The memory 325 may include a scheduler 134 that manages one or more hostpools 327. A hostpool 327 may be associated with a particular PE 235, operator 240, or more generally, a job. For example, an application developer may assign a hostpool 327 for each job, thereby associating each PE 235 in that job to the hostpool 327. Alternatively, the developer or scheduler 134 may individually assign each PE 235 or operator 240 to a hostpool 327. In one embodiment, the PE 235 may be associated with one or more hostpools 327 but each operator 240 in the PE 235 may be assigned to only one hostpool 327. The hostpool 327 may also have a predetermined size that stipulates how many hosts 130 may be "pinned" or assigned to the hostpool. This prevents the scheduler 134 from pinning too many hosts 130 to a hostpool 327 to the detriment of other jobs that may be sharing the same computer infrastructure 100. Further, in one embodiment, a hostpool 327 may be indexed much like an array. For example, host $130_1$ and host $130_2$ are pinned to Hostpool_A, Hostpool_A[0] may reference host $130_1$ while Hostpool_A [1] references host $130_2$. The hosts $130_{1-2}$ may be pinned to a particular index value based on what order the hosts $130_{1-2}$ were pinned to the hostpool 327 or by a developer or compiler specifying that a particular PE's host should be located at a particular index value—i.e., the "indexing the hostpool" constraint 255.

Other constraints 255 may be associated with the hostpools 327 such as "maximum size" which limits the number of hosts 130 that may be assigned to the hostpool 327, "tagged requirements" which are discussed in FIGS. 4A-B, "exclusive hostpool" which stipulates that the hosts 130 in the hostpool 327 may not be used by any other PEs 235 in any other jobs, and the like.

FIGS. 4A-4B illustrate tables detailing the assignment of hosts to hostpools, according to embodiments of the invention. Specifically, FIG. 4A illustrates tables that identify candidate hosts for a hostpool 327. Table 405 lists hosts 130 (Hosts A-F) that are available to a stream application. Each of the hosts 130 are assigned with a characteristic tag. The tag represents a characteristic of the host 130 such as whether the host 130 has high-memory, multiple processor cores, is compatible with a high-speed communication protocol, recently upgraded, a specific type of processor, a specific operating system, and the like. Moreover, the tag may abstract one or more characteristics by using a simple code word or number. For example, red may indicate a high-memory host 130 while green is a host 130 that has recently been upgraded and has a specific type of processor. Moreover, a host 130 may have multiple tags if it has more than one of the tagged characteristics. For example, Host C and D both have two tags. Additionally, a host 130 may not be assigned any tag or given a default tag if it does not have any of the tagged characteristics.

Table 410 lists three hostpools 327 (Hostpools 1-3) that have a predetermined size and tag. The size indicates the maximum number of hosts 130 that may be pinned to the hostpool 327. In one embodiment, the tag may be used to indentify hosts 130 that are eligible to be included into the hostpool 327. For example, a developer may stipulate that a PE 235 must be executed by a high-memory host 130—i.e., the PE 235 must be allocated to a host 130 with a certain characteristic. Accordingly, the developer or scheduler 134 may associate the PE 235 with a hostpool 327 that has the tag that corresponds to the high-memory characteristic. When determining candidate hosts for the PE 235, the scheduler 134 may match the tag of the hostpool 327 in Table 410 with the tag of the host 130 in Table 405.

Table 415 lists the possible hosts 130 that may be matched with each hostpool 327 by matching the tag constraint. Hosts A, B, or C may be pinned to Hostpool 1, Hosts C, E, or F may be pinned to Hostpool 2, and Host D may be pinned to Hostpool 3.

FIG. 4B depicts tables that illustrate the issues that arise when assigning PEs with constraints to hosts. Table 420 pins eligible hosts 130 to a hostpool 327. In this case, a host 130 is pinned based on at least two constraints 255 associated with the hostpool 327: whether it has a matching tag and whether the size of the hostpool 327 is met. As used herein, criteria are different than constraints 255. If a host 130 does not meet a constraint 255, the PE cannot be allocated to it. However, the scheduler 134 may use criteria to choose between multiple hosts that satisfy the constraints 255. For example, the scheduler 134 may use criteria such as selecting the host 130 with the most available processing power or selecting the highest ranked host from a predetermined ranking as the host 130 to pin to the hostpool 327 if there are multiple hosts 130 that satisfy the constraints 255—i.e., there are multiple candidate hosts.

For the sake of simplicity, the criterion used in Table 420 to choose between the multiple hosts 130 that satisfy the constraints 255 was alphabetical ordering of the hosts' labels. In this manner, Hosts A and B are pinned to Hostpool 1, Hosts C, D, and E are pinned to Hostpool 2, and Host D is pinned to Hostpool 3. Note that a host 130 may be pinned in multiple hostpools 327 so long as it matches the hostpool's tag.

Table 425 list possible constraints 255 that may be associated with PEs 235. As shown, each PE 235 is individually assigned to a particular hostpool 327 as well as being associated with at least one constraint 255. However, in one embodiment, a PE 235 may not have any constraints 255 or have multiple constraints 255. Because PE 1 and PE 2 are associated with the same co-located group, they must be allocated to the same host 130. PEs 2-5 are associated with the same ex-located group and thus cannot share the same host 130. That is, PE 2-5 must be allocated to different hosts 130 relative to each other but may be allocated to share a host with a PE 235 not in Ex-locate Group 1.

Applying the constraints 255 of Table 425 to the hostpools and pinned hosts of Table 420 show that it is an invalid assignment. Specifically, PE 1 and 2 must be located on the same host 130 but are assigned to two different hostpools 327 that do not have any pinned hosts 130 in common. To fix this problem, Host B in Hostpool 1 may be replaced with Host C since Host C has the necessary tags to be eligible for both Hostpool 1 and 2. In this manner, both PE 1 and PE 2 may be allocated to the same host 130—i.e., Host C.

However, this does not solve all the constraints 255. PE 2-5 must be allocated to separate hosts 130. Specifically PE 2, 4, and 5 are in Hostpool 2 and must each use a separate host 130; however, because Host D is in Hostpool 2, one of PE 2, 4, or 5 must be allocated to Host D which is also allocated to PE 3. To solve this problem, Host D in Hostpool 2 may be replaced by Host F. Table 430 lists one solution that satisfies both constraints 255—i.e., the tag characteristics required by the hostpools 327 and the ex-locate or co-locate groups associated with the PEs 235.

Figure 5:
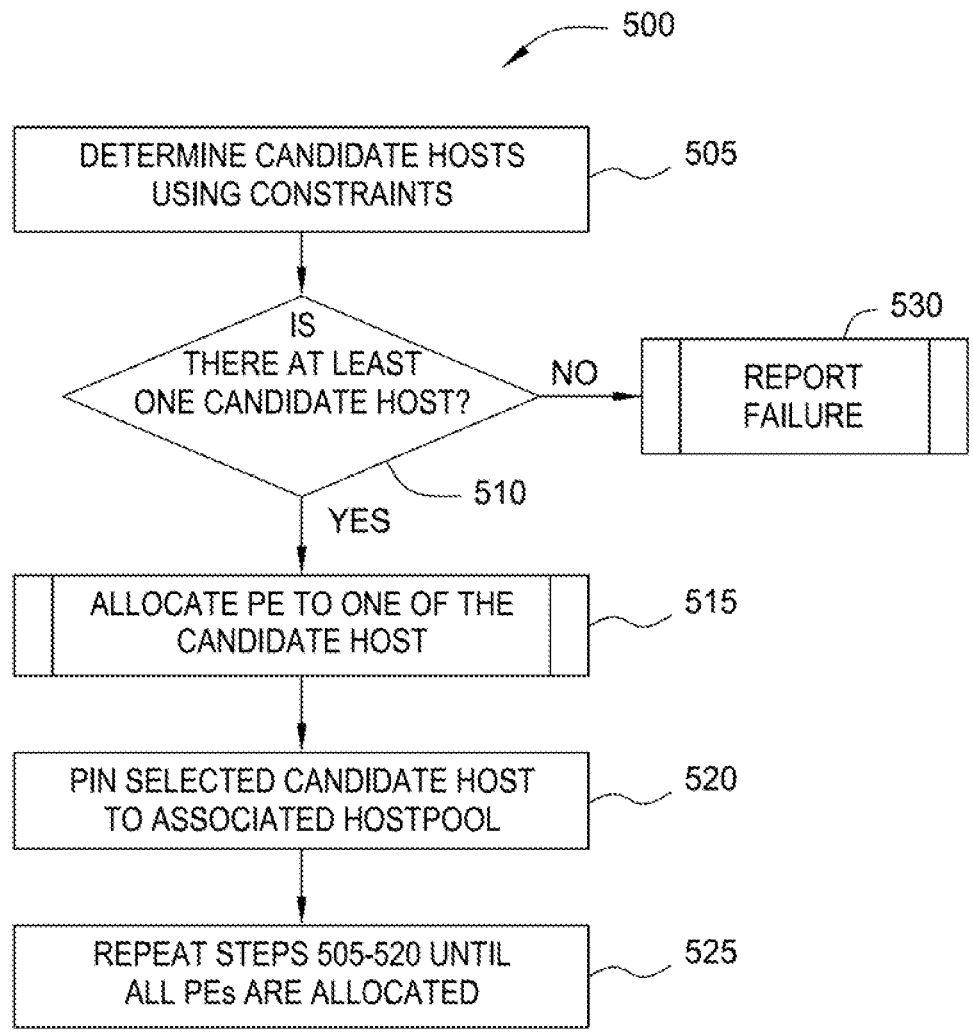
FIG. 5 is a flow diagram illustrating the assignment of hosts to a processing element, according to embodiments of the invention.

FIG. 5 is a flow diagram illustrating the assignment of one or more hosts to a hostpool, according to embodiments of the invention. The technique 500 illustrated in FIG. 5 avoids the issues shown in the tables of FIG. 4. The hostpool 327 provides a developer flexibility to add constraints 255 to a PE 235 yet without having to assign each individual PE 235 to a specific host 130.

At block 505, the scheduler 134 determines a candidate host set for a PE 235. In one embodiment, the scheduler may select a PE 235 that is associated with a job or choose a PE 235 based on the expected difficulty of placing the PE 235 on a host—e.g., the PE 235 that is associated with the most number of constraints. However, this invention is not limited to a particular method of selecting a PE from the plurality of PEs that may make up a stream application. In one embodiment, at block 505, the scheduler 134 may use the techniques disclosed in an application by the same inventor that is co-pending with the current application entitled "DYNAMICALLY CONFIGURABLE PLACEMENT ENGINE" application Ser. No. 13/308,800 (which is herein incorporated by reference) for selecting the appropriate PE 235.

In one embodiment, the scheduler 134 uses a constraints tree to identify the hosts 130 that satisfy the constraints 255 that are associated with the stream application elements such as hosts 130, hostpools 327, operators 240, PEs 235, and PE collections (e.g., jobs) that make up a stream application. The constraints 255 may be associated with only one or a combination of the different stream application elements. An example of a constraint tree will be discussed below with reference to FIG. 6.

At block 510, the scheduler 134 determines if at least one host 130 satisfies all the constraints 255 of the stream application. That is, whether there is at least one candidate host. If there is not one candidate host, the scheduler may report a failure at block 530. A failure may include informing the user of the stream application that the scheduler 134 was unable to allocate each of the PEs 235 of the stream application to a host 130 and meet the current constraints 255. The stream application may immediately inform the user of a failure when a PE 235 cannot be allocated, or alternatively, the scheduler 134 may continue to allocate the rest of the PEs 235 before indicating that the PE assignment process failed. In one embodiment, the scheduler 134 may use I/O device interface 310 to transmit a failure message to a display device.

However, if the scheduler 134 is able to identify at least one candidate host, the technique 500 continues to block 515 where the PE 235 may be allocated to one of these hosts.

Additionally, the scheduler 134 may further distinguish between hosts 130 that are unconditional candidate hosts and hosts 130 that are conditional candidate hosts. An "unconditional candidate host" is a host 130 that satisfies each constraint 255 that it has been applied. In contrast, a "conditional candidate host" is a host 130 that would be a candidate host (i.e., unconditional candidate host) for a particular PE 235 except that one or more constraints 255 are not currently satisfied. To change a conditional candidate host into an unconditional candidate host, one or more actions are performed to change a condition which would then satisfy the previously unsatisfied constraints. Alternatively, the constraint 255 itself may be modified or removed. For example, if a constraint 255 requires PE1 to be located on Host X, but Host Y meets all of the other constraints 255, then removing this constraint 255 results in Host Y changing from a conditional candidate host to an unconditional candidate host. Similarly, if an overloading constraint 255 associated with Host Z has been exceeded, but Host Z meets all other constraints 255, then modifying the overloading constraint (e.g., increasing the number of PEs 235 that may be allocated to Host Z) results in Host Z becoming an unconditional candidate host. Moreover, if a constraint 255 requires all hosts in a hostpool to have a red tag, the user may change the tag (i.e., a condition) of a conditional candidate host to red.

At block 515, if there are multiple unconditional candidate hosts, the scheduler 134 may choose between the unconditional candidate hosts using one or more criteria. As used herein, criteria are different than constraints 255. If a host 130 does not meet a constraint 255, the PE cannot be allocated to it. However, the scheduler 134 may use criteria to choose between multiple hosts that satisfy the constraints 255. In one embodiment, the scheduler 134 may select the candidate host with the lowest usage of CPU or the host 130 that uses the fastest communication protocol for inter-host communications. In another embodiment, the scheduler 134 may select the candidate host that the PE 235 has previously been allocated during a different job or instance of the same job. Alternatively, the host 130 may be chosen at random. In another embodiment, the scheduler 134 may the use the techniques discussed in the co-pending application "DYNAMICALLY CONFIGURABLE PLACEMENT ENGINE" application Ser. No. 13/308,800 which was mentioned previously. The invention is not limited to any particular method of selecting a host 130 from a plurality of candidate hosts.

However, if there is only one candidate host, the scheduler may automatically allocate the selected PE 235 to that candidate host. In another embodiment, the scheduler 134 may display conditional candidate hosts before allocating a PE 235 as will be discussed with reference to FIGS. 8 and 9.

At block 520, the scheduler 134 pins the candidate host to the hostpool 327 associated with the PE 235 that is allocated to the candidate host. In one embodiment, before pinning the candidate host to the hostpool 327 associated with the PE 235, the scheduler 134 may first determine if the candidate host is already pinned to the hostpool 327. If not, the scheduler 134 may pin (or assign) the candidate host to the hostpool 327. Part of this process may require assigning an index value to the candidate host in the hostpool 327 though this is not required to perform this invention. Assigning an index values and associating hosts 130 with hostpools 327 is discussed in further detail in an application by the same inventor that is co-pending with the current application entitled "AGILE HOSTPOOL ALLOCATOR" application Ser. No. 13/308,841 which is herein incorporated by reference. After pinning the suitable host or determining that the suitable host is already included in the hostpool 327, at block 525 the technique 500 may be repeated for each of the PEs 235 in a stream application.

Figure 6:
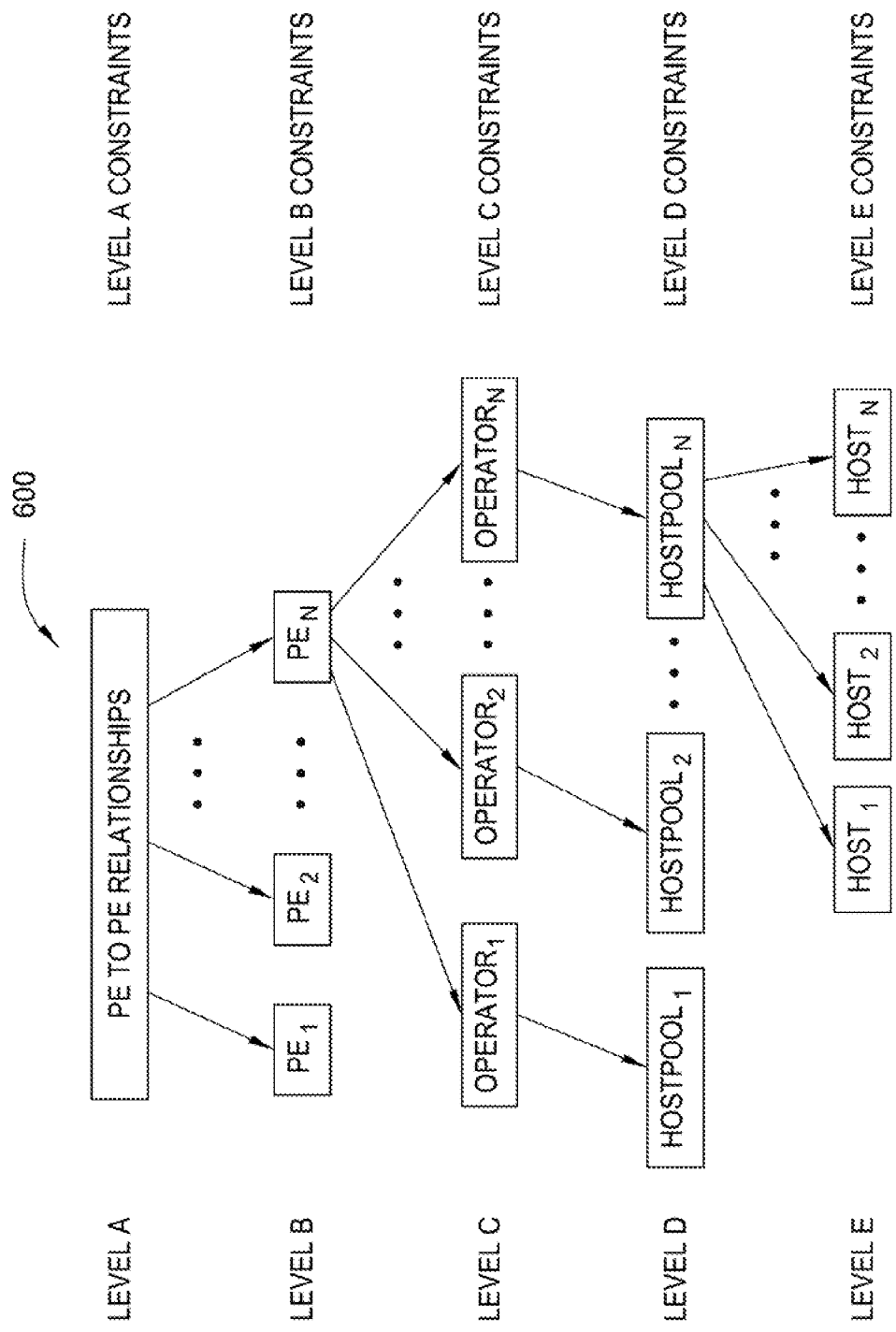
FIG. 6 illustrates a constraint tree for applying constraints, according to one embodiment of the invention.

FIG. 6 illustrates a constraint tree for applying constraints, according to one embodiment of the invention. Specifically, the constraint tree 600 is one technique for determining candidate hosts using constraints 255—i.e., block 510 of FIG. 5. In one embodiment, the constraint tree 600 divides up the different elements in a stream application by type into multiple levels that form a hierarchical relationship. The top level—Level A—includes one or more jobs or collections of PEs 235. Level B includes the one or more PEs 235 that comprise the job or collection. As mentioned previously, a PE 235 may have one or more fused operators 240 which are represented by Level C of the tree 600.

In one embodiment, each operator 240 associated with a PE 235 is assigned to only one hostpool 327 while a PE 235 may be associated with one or more hostpools 327. Level D shows that the operators 240 associated with $PE_N$ are each associated with only one hostpool 327. However, the operators 240 may be associated with the same hostpool 327. Finally, each hostpool 327 may include one or more hosts 130—i.e., Level E. For the sake of clarity, many of the hierarchical relationships of the different levels, such as the operators associated with $PE_1$ and $PE_2$, are omitted from the figure.

In one embodiment, the scheduler 134 may use the constraint tree 600 to determine unconditional candidate hosts—i.e., hosts 130 that meet Level A-E constraints. The constraint tree 600 is a graphical representation of the different types of constraints that may be used to allocate the selected PE 235 to a host 130. That is, each constraint tree 600 may look different for each PE 235. Each level represents different types of constraints that may be checked by the scheduler 134. For a selected PE 235, the scheduler 134 may start at Level E and apply Level E constraints—i.e., constraints 255 associated with hosts 130. Level E constraints may include overloading or scheduling constraints as discussed previously. For example, the scheduler 134 may determine whether each host 130 in Level E is overloaded or if the host 130 is being used exclusively by a different job from the job that includes the currently selected PE 235. After determining which hosts 130 meet Level E constraints, the scheduler 134 may return to Level D to apply Level D constraints—i.e., constraints associated with hostpools 327—such as whether the hosts 130 selected from Level E have the same tag as the Level D hostpool 327 or if the size requirements of the hostpool 327 have been met. After applying Level D constraints, the scheduler 134 returns the hosts 130 that satisfy Level D and E constraints to Level C.

For each of the operators 240 in the selected PE 235, the scheduler 134 may apply Level C constraints associated with the operators 240 such as whether the operators 240 must run on a specific host 130 or whether one of the operators 240 should be the only operator 240 running on the host 130. The scheduler 134 checks the Level C constraints for each of the operators 240 against the candidate hosts returned from Level D. The hosts 130 that satisfy all the constraints 255 for at least one of the operators 240 are returned to Level B where the Level B constraints are applied. For example, the scheduler 134 may perform an Intersect function to determine if any of the hosts 130 that satisfy all of the constraints of at least one of the operators 240 of Level C also satisfies all the constraints 255 of all of the operators 240 in the selected PE 235. Additionally or alternatively, the Level B constraints may include determining whether the PE 235 is non-relocatable or if there is a constraint 255 that overrides any of the Level C-E constraints.

After determining which host or hosts 130 satisfy the constraints for Levels B-E, the scheduler 134 determines whether these hosts 130 also satisfy the constraints of Level A such as ex-locate or co-locate. That is, if $PE_1$ (e.g., the currently selected PE) and $PE_2$ must be co-located, then at Level A the scheduler 134 may perform an Intersect function to determine whether the two PEs 235 have at least one host 130 in common that meets all the Level B-D constraints for the respective PEs 235. If so, that host or hosts 130 become the unconditional candidate hosts for $PE_1$. In this manner, the scheduler 134 may use the constraint tree 600 to ensure that all constraints 255 are satisfied to identify at least one unconditional candidate host for a selected PE 235.

Also, the constraint tree 600 may aid the scheduler 134 to indentify conditional candidate hosts. Generally, as the scheduler 134 moves from the bottom of the constraint tree 600 to the top, the number of unconditional candidate hosts shrinks as the constraints from each level are considered. Instead of ignoring the eliminated unconditional candidate hosts, the scheduler 134 may instead group the eliminated hosts into a set of conditional candidate hosts. Moreover, the scheduler 134 may record in memory 325 or storage 330 the constraint 255 that the conditional candidate host violated. For example, Host W may have satisfied all the constraints 255 associated with Levels D and E but fails an operator 240 constraint at Level C. The scheduler may save Host W in the conditional candidate host set along with the constraint 255 that it failed. Additionally, the scheduler 134 may continue to evaluate each conditional candidate host as it traverses up the constraint tree 600. Continuing the previous example, the scheduler 134 may compare Host W to the Level B constraints. If Host W satisfies all those constraints 255 then the scheduler 134 may not store those constraints 255. Or the scheduler 134 may store a flag that indicates Host W satisfies all Level B constraints. However, if Host W does not satisfy all of the Level B constraints, the scheduler 134 may store any constraints 255 that Host W did not meet at that level as well. This process may continue until the scheduler 134 has finished traversing the constraints tree 600 or until the scheduler 134 has identified all conditional or unconditional candidate hosts for a particular PE 235.

In one embodiment, the hosts 130 eliminated from the unconditional candidate host set may be added to the conditional candidate host set when the scheduler 134 traverses above a predefined level of the constraint tree 600. For example, if Host W is unconditional candidate host after the scheduler 134 applies the constraints of Level D but does not satisfy one of the Level C constraints, Host W is not placed in the conditional candidate host set—i.e., only the unconditional candidate hosts that meet all the Levels C, D, and E constraints may be become conditional candidate hosts. But if Host W meets all the Levels C, D, and E constraints but not all the Level B constraints, Host W may become a conditional candidate host.

In one embodiment, the scheduler 134 may remove a host 130 from the conditional candidate host set if the host 130 violates a predefined number of constraints—e.g., a conditional candidate host cannot violate more than three constraints. Accordingly, if Host 130 violates a Level D constraint, a Level C constraint, and two Level A constraints it would be removed from the conditional candidate host set—i.e., ignored by the scheduler 134.

In one embodiment, the scheduler 134 may remove a host 130 from the conditional candidate host set if the host 130 violates a certain type of constraint 255. For example, Level B constraints may be prioritized as the constraints that most affect the performance of the stream application. Accordingly, if a conditional candidate host violates a Level B constraint it may be removed from the set even if it does not violate any other constraint 255. Alternatively or additionally, the scheduler 134 may consider a maximum number of constraints 255 as well as a type of constraint 255 when prioritizing conditional candidate hosts. For example, the policy may be set such that the maximum number of constraint violations is three, and only one of those violations may be a Level A constraint violation, before a host 130 is removed from the conditional candidate host set.

FIG. 7A illustrates a portion of a constraint tree according to one embodiment of the invention. Specifically, the tree 705 may represent a portion of the constraint tree 600. For example, the parent node may be $PE_N$ while the child $nodes_{1-3}$ represent $operators_{1-N}$. However, the constraint tree 705 may represent any portion of the constraint tree 600. For example, the child $nodes_{1-3}$ may be associated with one or more nodes below them while the parent node may also be a child node for a higher level node.

As stated previously, at the lowest level of the constraint tree 600 the scheduler 134 determines the maximal set of unconditional candidate hosts which it then prunes as the host set is passed up the tree and each host 130 in the unconditional candidate host set is compared to the constraints 255 at each level. In contrast, the conditional candidate host set may grow as the scheduler 134 traverses towards the top of the tree 600. Specifically, conditional candidate hosts may be added while previously identified unconditional candidate hosts violate additional constraints 255. This set may be culled, however, if the conditional candidate hosts violate certain constraints 255 or if they exceed a threshold number of violations. That is, the conditional candidate hosts identified when evaluating lower level constraints 255 may also be compared to the constraints 255 of the current level. This may result in additional conditions (or user actions) being added to them, or in some case it may be result in one of the conditional candidate hosts being removed from the conditional host set altogether.

FIG. 7B illustrates a table associated with the constraint tree 705 in FIG. 7B. Specifically, the table 710 details the unconditional and conditional candidate hosts for the parent and child $nodes_{1-3}$. An unconditional candidate host is outlined in a square while a conditional candidate host is underlined. Underneath each conditional candidate host is a corresponding user action. As used herein, a "user action" is an action that may be performed that changes the conditional candidate host to an unconditional candidate host. An action may include remove, changing, ignoring, or adding one or more constraints 255, changing a condition by modifying a host, PE, operator, job, etc, such that the violated constraint is satisfied. That is, the user action describes an operation that when performed results in a change to a condition or constraint 255 that once met or removed, enables the conditional candidate host to become an unconditional candidate host. In one embodiment, the user action changes a characteristic of the conditional candidate host such as modifying a tag characteristic of the conditional host, disabling host load protection and modifying other attributes that affect the runtime characteristics of the host.

In one embodiment, the user action is transmitted to the user of the stream application who may perform or instruct the scheduler 134 to perform the action, thereby changing the associated conditional candidate host to an unconditional candidate host. In one embodiment, each constraint violation of the conditional candidate host may correspond to one user action that may be performed to remove the violation, however, the invention is not limited to a one-to-one relationship.

For Child Node 1, the unconditional candidate hosts include Host B and Host D and the conditional candidate hosts include Host A and C. The user action associated with conditional Host A that would change Host A into an unconditional candidate host is adding the tag "red" to Host A. Alternatively, the user action could be eliminating the constraint 255 that requires a red tag or modifying the constraint 255 such that it requires the same tag that is currently associated with Host A. The user action associated with conditional Host C requires canceling Job 1 to change Host C to an unconditional candidate host. For example, this user action may be based on an exclusive hostpool constraint that disallows Host C to be used by more than one job. Satisfying this constraint by stopping Job 1 (assuming it is the only other job using Host C) qualifies Host C to become an unconditional candidate host.

Child node 2 may have different constraints than child node 1 or have a different candidate set returned from lower levels of the constraint tree 600. As shown, Host A is a conditional host for Child Node 1 but an unconditional host for Child Node 2. Because the tree structure 705, and thus the constraints, may be different for levels below the respective child nodes$_{1-3}$, the candidate host set may also be different for each node at a particular level. For example, if the child nodes$_{1-3}$ are operators 240 (i.e., Level C) and the lower level comprises hostpools 327 (i.e., Level D), the tag associated with Child Node 1's hostpool may be blue but the tag associated Child Node 2's hostpool may satisfy the constraint. Accordingly, the Host A is returned to Child Node 1 as a conditional candidate host but is an unconditional candidate host for Child Node 2.

Host B is not a conditional or unconditional candidate host of Child Node 3. Thus, there is no user action that could change Host B into an unconditional candidate host. In one embodiment, the scheduler 134 is unable to remove or modify certain constraints 255 or characteristics of the stream application elements. Accordingly, if a host 130 does not satisfy such a constraint 255, the host 130 cannot be a conditional or unconditional candidate host. For example, a non-modifiable constraint may be a constraint 255 that is part of the compiled code comprising the stream application. To modify or remove these constraints 255 the source code of the stream application may have to be modified. Such constraints 255 include ex-locate, co-locate, indexing the hostpool, and the like.

In contrast, other user actions may not modify the source code. For example, a user may be able to select particular constraints 255 that are ignored when allocated PEs 235 to hosts 130—e.g., an overloading constraint for placing too many PEs on a particular host. Moreover, any condition that can be changed such as changing or adding a tag to a host, restarting a compute node, or cancelling a job do not change the source code of the streaming application. Thus, in this embodiment, the scheduler 134 may be configured to not consider actions that require the user to change source code and only propose user actions such as changing a condition or ignoring a particular constraint. In this case, if a constraint cannot be satisfied by a viable user action, then a host that fails this constraint could not be placed in the conditional candidate host set.

In contrast, a constraint 255 that may be modified, removed, or added are constraints 255 that define the runtime characteristics of the stream application such as the performance of the hosts. Such constraints include hostpool tag constraints, overloaded constraints, exclusive hostpool constraints, and the like. These constraints may be modified without changing the source code of the stream application. In one embodiment, the constraints that may be modified, removed, or added are constraints 255 associated with a hostpool 327. Similarly, characteristics of the hostpools 327 and hosts 130 may also be altered without requiring changes to the underlying source code.

In one embodiment, the scheduler 134 may record the user actions necessary to add a new host to the unconditional candidate host set. For example, the system administrator could add the new host to the computer infrastructure 100. As shown by the bottom row of Table 710, the listed user actions detail the actions necessary to enable the new host to become an unconditional candidate host.

The scheduler 134 may evaluate the constraints 255 associated with the child node level against the combined conditional and unconditional candidate set from lower levels and pass the modified candidate set to the parent node. This result is shown in the right-most column of table 710. Specifically, the column illustrates how a node in the constraint tree 600 determines a candidate set when receiving a candidate set from multiple nodes in a lower level of the constraint tree 600. For example, the scheduler 134 may evaluate the candidate host set from each of the child nodes$_{1-3}$ to determine if there is an intersection between the candidate sets. As shown, performing an intersect function yields one unconditional candidate host—Host D. This means that Host D meets all the constraints 255 associated with all three child nodes$_{1-3}$ as well as the constraints in any related lower-level nodes. Performing an intersection on the child nodes$_{1-3}$ also yields the conditional candidate host set as well as the user actions needed for the conditional candidate hosts to become an unconditional candidate hosts. For example, Host A becomes an unconditional candidate host of the parent node if red and blue tags are added to the host 130. The red tag is added to satisfy the constraint 255 associated with Child Node 1 and the blue tag is added to satisfy the constraint 255 associated with Child Node 3.

Host D is the only unconditional candidate host for the parent node. That is, because Host D is an unconditional candidate of all the child nodes$_{1-3}$, it is also an unconditional candidate host for the parent node. Host A, C, and the new host are conditional candidate host that require one or more user actions to become unconditional candidate hosts. Host B cannot be a candidate host for the parent node—e.g., Host B violates a constraint 255 that the scheduler 134 is unable to modify or remove.

Figure 8:
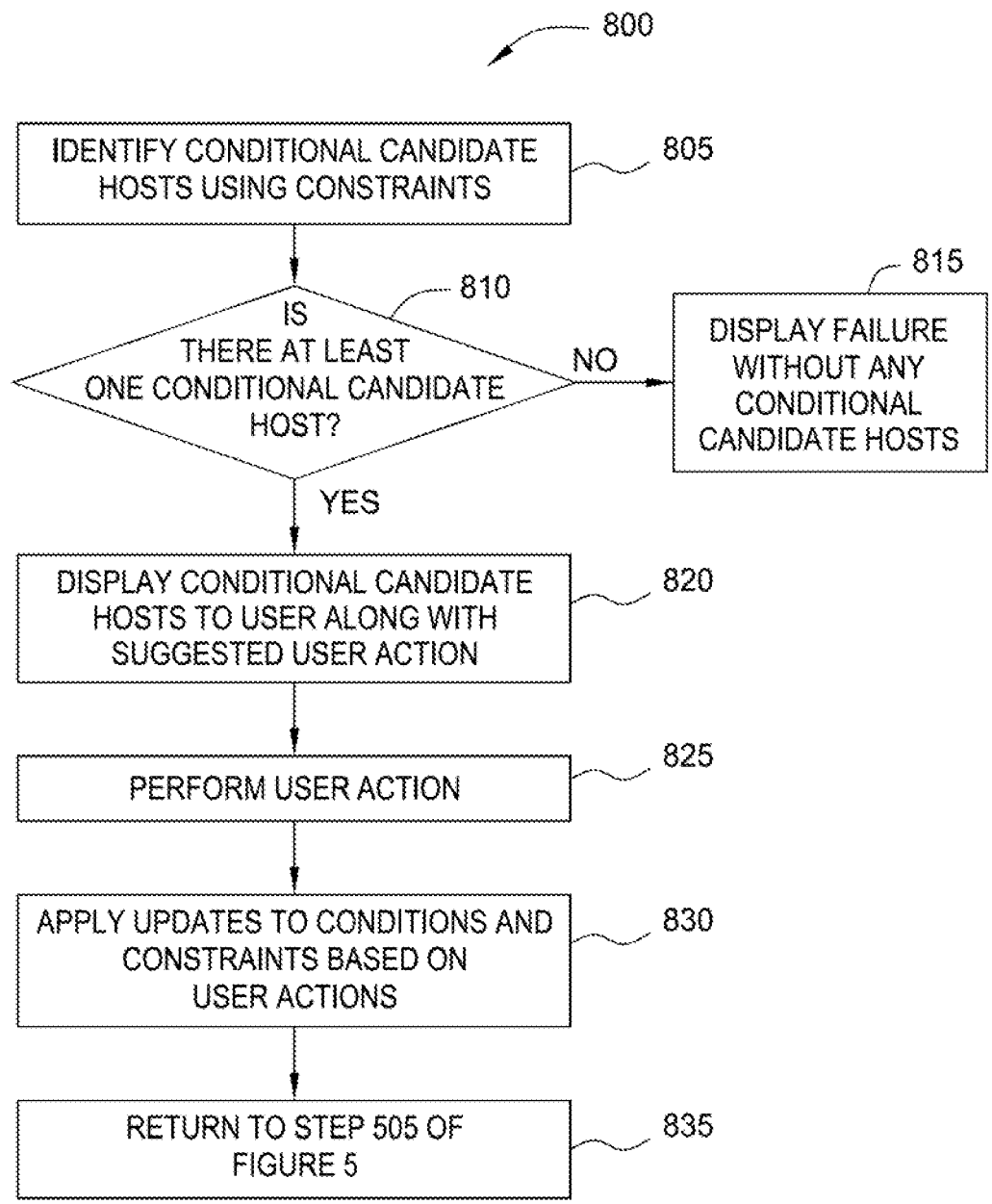
FIG. 8 is a flow diagram illustrating the process of performing a user action to change a conditional candidate host to an unconditional candidate host, according to one embodiment of the invention.

FIG. 8 is a flow diagram illustrating the process of selecting user actions associated with conditional candidate hosts, according to one embodiment of the invention. Specifically, FIG. 8 describes in more detail block 530 of FIG. 5 which reports failure when the scheduler 134 is unable to allocate all of the PEs 235. As mentioned previously, the scheduler 134 reports a failure if there is no candidate host—i.e., an unconditional candidate host. However, at block 805, the scheduler 134 may use the process shown in FIGS. 7A-B to identify one or more conditional candidate hosts of a selected PE 235.

At block 810, the scheduler 134 determines whether it has identified at least one conditional candidate host. If not, at block 815, the scheduler 134 may transmit for display a failure message that does not include conditional candidate hosts or a message that indicates that there is no unconditional or conditional candidate hosts for the PE 235.

If there is at least one conditional candidate host, at block 820, the scheduler 134 may transmit for display a message that shows conditional candidate hosts as well as one or more user actions that may be performed to change the conditional candidate host to an unconditional candidate host. The user may perform the user action or instruct the scheduler 134 to perform the action. For example, at block 825, the scheduler 134 may change a characteristic of the conditional candidate host or remove the constraint that the conditional candidate host violated. Additionally or alternatively, the user may perform the user action herself such as resetting the conditional candidate host. In one embodiment, if the user chooses not to perform a user action, the scheduler 134 may fail to allocate each of the PEs 235 and the stream application would not execute.

Once the user action is performed, at block 830, the scheduler 134 may update the conditions and/or constraints that were changed by the user action. The process 800 may then return to block 505 of FIG. 5 to determine a candidate host for a different selected PE 235.

Figure 9:
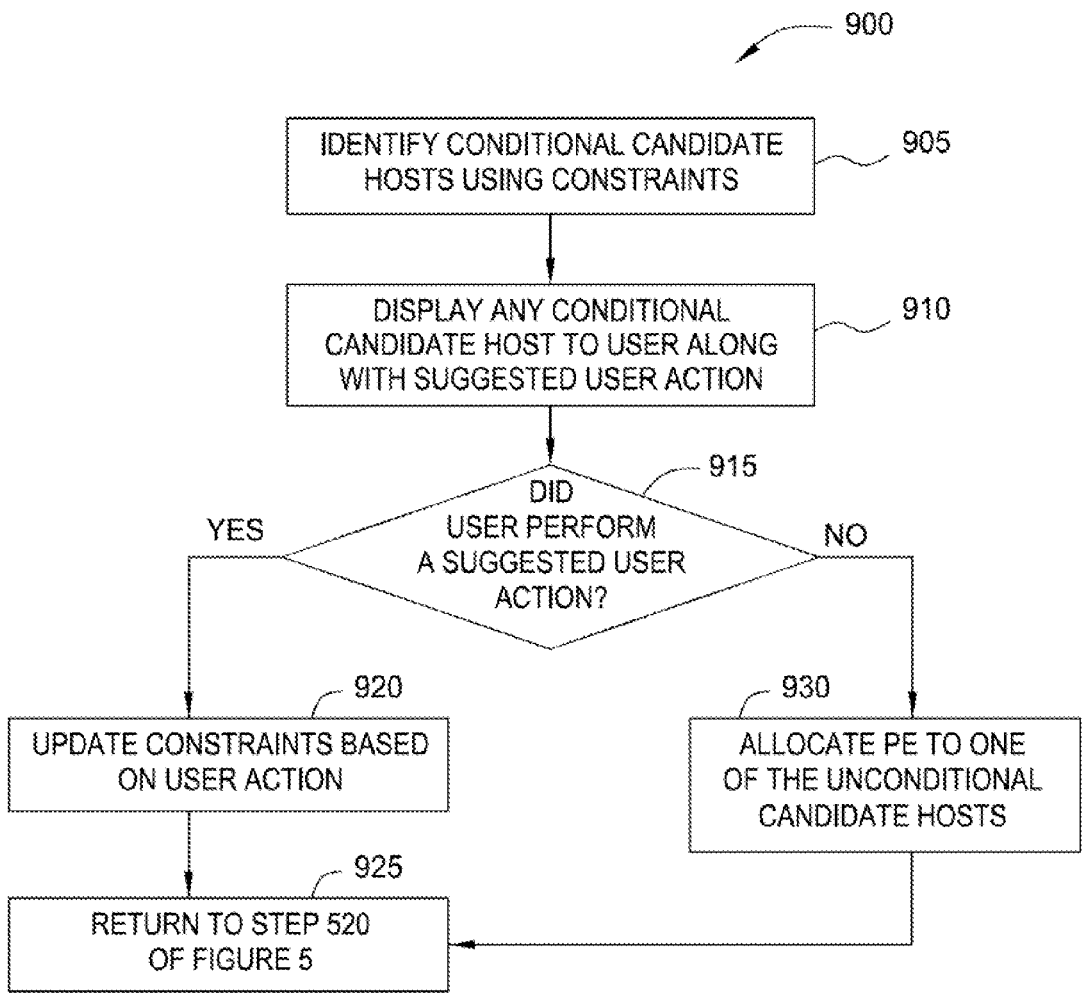
FIG. 9 is a flow diagram illustrating the process of performing a user action to change a conditional candidate host to an unconditional candidate host, according to one embodiment of the invention.

FIG. 9 is a flow diagram illustrating the process of selecting user actions associated with conditional candidate hosts, according to one embodiment of the invention. Specifically, FIG. 9 describes in more detail block 515 of FIG. 5 which allocates the PEs 235 to a candidate host. In one embodiment, a user may wish to allocate a PE 235 to a conditional candidate host rather than an unconditional candidate host. Accordingly, at block 905, the scheduler 134 may use the process shown in FIGS. 7A-B to identify one or more conditional candidate hosts of a selected PE 235.

At block 910, the scheduler 134 may transmit for display a list of conditional candidate hosts with their associated user actions. Additionally, the list may include the unconditional candidate hosts. As an example, the displayed list may appear like the right-most column of Table 710 of FIG. 7. The user is then able to identify the unconditional Host D as well as the conditional Hosts A, C and the new host. The user may evaluate this information and determine if the unconditional candidate host is the best location for the PE 235. For example, the user may be a system administrator that knows that Host D is undergoing maintenance or will be used heavily in a future job. Accordingly, the graphic may include a selectable button or text that instructs the scheduler 134 to perform the user action or actions associated with one or more of the conditional candidate host. If at block 915 the user performs a user action or instructs the scheduler 134 to perform the action, then at block 920 the constraints 255 are updated to illustrate that the associated conditional candidate host is now an unconditional candidate host. In this manner, the user is able to select a conditional candidate host even when an unconditional candidate host is identified.

In one embodiment, the scheduler 134 may automatically allocate the selected PE 235 to that new unconditional candidate host. At block 925, the process 900 may return to block 520 of FIG. 5. However, if the user does not choose to perform a user action, at block 930 the scheduler 134 may automatically allocate the selected PE 235 to one of the already identified unconditional candidate hosts.

Although FIGS. 8 and 9 were discussed as displaying conditional candidate hosts for each selected PE 235, in one embodiment the scheduler 134 may wait until it has attempted to allocate all the PEs 235 in the stream application. The scheduler 134 may display a list for each PE 235 containing the unconditional and conditional candidate hosts, if any. Further, the scheduler 134 may automatically allocate a PE 235 to an unconditional candidate host and flag any PEs 235 that did not have at least one unconditional candidate host. This may enable the user to quickly identify the unallocated PEs to perform a user action that would then permit the PE to be allocated to a new unconditional candidate host. Alternatively, the scheduler 134 may only display conditional candidate hosts for PEs that do not have at least one unconditional candidate host.

Moreover, the scheduler 134 may prioritize conditional candidate hosts for display. For example, conditional candidate hosts may be ranked according to the number or type of conditions associated with them—e.g., a conditional candidate host with two needed user actions may be prioritized higher than a host with three user actions. The scheduler may further filter conditional candidate hosts such that only conditional candidate hosts with less than a predetermined threshold number of user actions or constraint violations are displayed.

Conclusion

The present embodiments establish a stream application that uses small chunks of executable code configured to process data tuples flowing into a processing element. A scheduler allocates the processing elements to individual compute nodes or hosts for execution. However, the stream application may assign various constraints that stipulate which hosts are suitable for a particular processing element. If a host meets the constraints, it may be categorized as an unconditional candidate host. In addition, the scheduler may also track conditional candidate hosts that would be suitable for the processing element if a certain user action is performed—e.g., modifying a constraint, removing a constraint, modifying a stream application element (e.g., a processing element, operator, hostpool, job, or host), and the like. The list of conditional candidate hosts may then be displayed to the user who can choose to perform the one or more actions to change the conditional candidate host to an unconditional candidate host for the processing element.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for allocating a processing element selected from a plurality of processing elements to one of a first and a second compute nodes, computer-implemented method comprising:

prioritizing for display an indication of the first compute node and an indication of the second compute node based on respective total number of unsatisfied constraints associated with the first and second compute nodes, wherein the respective unsatisfied constraints are selected from a plurality of constraints in a constraint tree;

associating the first compute node and the second compute node with respective user actions, wherein each user action at least one of: (i) changes a condition such that the associated compute node satisfies an unsatisfied constraint and (ii) instructs that the unsatisfied constraint of the associated compute node be ignored;

upon determining the first and second compute nodes satisfy at least one constraint in the constraint tree, transmitting for prioritized display the indication of the first compute node and the associated user actions and the indication of the second compute node and the associated user actions; and responsive to the user performing at least one of the respective user actions, allocating, by operation of one or more computer processors, the processing element to the first or second compute node associated with the performed user action.

2. The computer-implemented method of claim 1, wherein the plurality of processing elements performs different tasks associated with a streaming application.

3. The computer-implemented method of claim 2, wherein the respective user actions do not change source code associated with the streaming application, wherein the respective user actions comprise at least one of: ignoring the unsatisfied constraint, satisfying the unsatisfied constraint by modifying a characteristic of the first or second compute nodes, modifying a job associated with the first or second compute nodes, and restarting the first or second compute nodes.

4. The computer-implemented method of claim 1, wherein the constraint tree is a hierarchical data structure with a plurality of levels, wherein each level consists of a particular type of one or more stream application elements, and wherein a first constraint is associated with at least one stream application element in a first level and a second constraint is associated with at least one stream application element in a second level.

5. The computer-implemented method of claim 4, wherein the types of stream application elements comprise processing elements, operators, compute nodes, hostpools, and jobs.

6. The computer-implemented method of claim 1, wherein the plurality of processing elements establish an operator graph of the plurality of processing elements, the operator graph defining at least one execution path and wherein at least one of the processing elements of the operator graph is configured to receive data from at least one upstream processing element and transmit data to at least one downstream processing element.

7. A computer-implemented method for allocating a processing element selected from a plurality of processing elements to a first compute node, computer-implemented method comprising:

comparing the first compute node to a first constraint associated with a first level of a constraint tree, the first constraint determining whether the first compute node can be allocated to the processing element;

if the first compute node does not satisfy the first constraint, determining whether the first compute node satisfies a second constraint of the constraint tree;

if the first compute node does satisfy the second constraint, transmitting for display a user action that at least one of (i) changes a condition such that the first compute node satisfies the first constraint and (ii) instructs the first constraint to be ignored;

after the user action is performed, allocating, by operation of one or more computer processors, the processing element to the first compute node;

determining if the first compute node satisfies other constraints associated with the constraint tree;

determining a total number of unsatisfied constraints associated with the first compute node;

determining for a second compute node a total number of unsatisfied constraints, wherein the second compute node is compared to the same constraints as that of the compute node; and prioritizing for display an indication of the first compute node and an indication of second compute node based on the respective total number of unsatisfied constraints for the first compute node and second compute node.

8. A computer-implemented method for allocating a processing element selected from a plurality of processing elements to a first compute node, computer-implemented method comprising:

comparing the first compute node to a first constraint associated with a first level of a constraint tree, the first constraint determining whether the first compute node can be allocated to the processing element;

upon determining the first compute node does not satisfy the first constraint, determining whether the first compute node satisfies a second, different constraint associated with a second level of the constraint tree;

determining a total number of unsatisfied constraints associated with the first compute node;

determining for a second compute node a total number of unsatisfied constraints, wherein the second compute node is compared to the same constraints as that of the compute node;

prioritizing for display an indication of the first compute node and an indication of second compute node based on the respective total number of unsatisfied constraints for the first compute node and second compute node, wherein the processing element is communicatively coupled to at least one other processing element located on a separate compute node to form an operator graph for processing streaming data; and upon determining at least one of the first and second compute nodes does satisfy the second constraint, transmitting for display a user action that at least one of (i) changes a condition such that the first or second compute node satisfies the first constraint and (ii) instructs the first constraint to be ignored.

9. The computer-implemented method of claim 8, further comprising:
after the user action is performed, allocating, by operation of one or more computer processors, the processing element to the at least one of first and second compute nodes.

10. The computer-implemented method of claim 7, wherein the plurality of processing elements performs different tasks associated with a streaming application.

11. The computer-implemented method of claim 7, wherein the user action does not change source code associated with the streaming application, wherein the user action comprises at least one of: ignoring the first constraint, satisfying the first constraint by modifying a characteristic of the compute node, modifying a job associated with the compute node, and restarting the compute node.

12. The computer-implemented method of claim 7, wherein the constraint tree is a hierarchical data structure with a plurality of levels, wherein each level consists of a particular type of one or more stream application elements, and wherein the first constraint is associated with at least one stream application element in the first level and the second constraint is associated with at least one stream application element in a second level.

13. The computer-implemented method of claim 12, wherein the types of stream application elements comprise processing elements, operators, compute nodes, hostpools, and jobs.

14. The computer-implemented method of claim 7, wherein the plurality of processing elements establish an operator graph of the plurality of processing elements, the operator graph defining at least one execution path and wherein at least one of the processing elements of the operator graph is configured to receive data from at least one upstream processing element and transmit data to at least one downstream processing element.

* * * * *